United States Patent Office 3,094,423
Patented June 18, 1963

3,094,423
NEUTRAL COLORED GLASS COMPOSITION
Earl K. Davis, Ogden, N.Y., assignor to Bausch & Lomb Incorporated, Rochester, N.Y., a corporation of New York
No Drawing. Filed Sept. 30, 1960, Ser. No. 59,486
1 Claim. (Cl. 106—52)

This invention relates to a novel glass composition, and more particularly, to a novel ophthalmic glass composition having restricted transmission characteristics and a desirable, neutral gray color especially well suited for use as sunglass lenses of both the prescription and planotypes.

One important object of the invention is to provide an ophthalmic glass of novel composition having a pleasing neutral color especially suited for use in sunglasses and the like.

Other objects are: to provide a novel glass composition of this character having a refractive index of 1.523 so that it may be surfaced according to standard ophthalmic curves similarly to conventional clear eye-glass lenses of similar power; to provide a novel composition of this kind having softening characteristics compatible with the characteristics of colored high index glasses so that it may be used to make countersink blanks to which the high index glass is fused to make multi-focal lenses; and, in general, to provide a novel glass composition having properties such that it is suitable for a relatively wide range of ophthalmic applications.

Compositions according to the present invention fall generally within the following range of ingredients, parts by weight, batch basis:

| | |
|---|---|
| Silica | 65.3 |
| Alumina | 0 to 1 |
| Potash | 9.5 to 9.0 |
| Soda | 8.75 to 9.25 |
| Zinc oxide | 13 |
| Ferric oxide | 2.5 to 2.75 |
| Nickel oxide | 0.15 to 0.20 |
| Cobaltous oxide | .005 to .010 |
| Charcoal | .05 to 0.10 |
| Arsenous oxide | 0 to 1.0 |
| Antimony oxide | 0 to 1.0 |

The glasses of the invention may be denoted as lime-free crown glass. They have a desirable neutral color especially well suited for use as sunglasses. Their transmittance at 2 mm. thickness is about 31% in the visible range. Their refractive index is about 1.523 and is readily controllable by relatively small variations in composition as explained hereinafter.

A preferred composition of the invention is as follows, batch basis:

| | Percent by weight |
|---|---|
| Silica | 67.03 |
| Alumina | 0.50 |
| Potash | 9.45 |
| Soda | 8.95 |
| Zinc oxide | 10.88 |
| Ferric oxide | 2.63 |
| Nickel oxide | 0.185 |
| Cobaltous oxide | .0075 |
| Charcoal | .088 |
| Arsenous oxide | 0.50 |
| Antimony oxide | 0.75 |

The glasses of the invention may be made according to conventional techniques such as by melting the ingredients at about 2600° F., fining at this temperature, cooling to about 2000° F., thoroughly mixing as by stirring, and then casting or extruding to form shaped bodies. The shaped bodies are then annealed similarly to ordinary crown ophthalmic glasses of similar silica content.

The alumina in the compositions acts to control the viscosity. Increasing proportions of alumina result in higher viscosity, and compositions that do not include alumina are of relatively low viscosity at their working temperatures. The proportion of alumina to be included in any particular batch will depend upon the working characteristics desired in the glass, particularly in view of whether or not the glass is to be used for fusing in a multi-focal lens production process and the characteristics of the glass to which it is to be fused.

The soda and pot ash appear to act as stabilizers and fluxes. It has been found that a mixture of these two ingredients provides a more desirable color in the glasses than the use of either one alone, improves the stability of the glass, and affects the viscosity in a direction to make it better suited for fusing to high index colored glasses in the manufacture of multi-focal lenses.

The zinc oxide is used in place of the more conventional lime, and acts to control the refractive index. The use of zinc oxide in place of lime is essential according to the invention in order to provide the desirable gray color of the glass.

The iron, nickel, and cobalt oxides, together with the charcoal, which last is thought to be lost during the melting operation, affect the absorption characteristics of the glass and are the principal color providing ingredients. The charcoal affects the iron, balancing the color produced by it between a yellowish and a bluish tinge. All of these ingredients, along with the zinc oxide appear to be necessary to produce the desired grayness, or absence of hue in the glass.

The arsenic and antimony oxides are conventional fining agents, and appear to have little effect otherwise on the glass. The glasses according to the invention have a transmittance at 2 mm. thickness of about 31%. The C.I.E. data for elements made of the composition of the preferred embodiment of the invention are as follows:

T=29.4% at 2.0 mm.
λ=555
P=5%

What is claimed is:
A gray colored ophthalmic glass consisting essentially of the following ingredients, parts by weight, batch basis:

| | Weight percent |
|---|---|
| Silica | 67.03 |
| Alumina | 0.50 |
| Potash | 9.45 |
| Soda | 8.95 |
| Zinc oxide | 10.88 |
| Ferric oxide | 2.63 |
| Nickel oxide | 0.185 |
| Cobaltous oxide | .0075 |
| Charcoal | .088 |
| Arsenous oxide | 0.50 |
| Antimony oxide | 0.75 | said glass being of a neutral gray color and having a transmittance at 2 mm. thickness of about 31%.

References Cited in the file of this patent
UNITED STATES PATENTS

| | | |
|---|---|---|
| 2,034,994 | Sharp et al. | Mar. 24, 1936 |
| 2,581,639 | Duncan et al. | Jan. 8, 1952 |
| 2,901,366 | Smith et al. | Aug. 25, 1959 |
| 2,956,892 | Duncan | Oct. 18, 1960 |